(12) United States Patent
Kettle et al.

(10) Patent No.: US 7,318,645 B2
(45) Date of Patent: Jan. 15, 2008

(54) BEAM SPLITTER

(75) Inventors: Wiatt E. Kettle, Corvallis, OR (US);
Scott Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 11/150,561

(22) Filed: Jun. 9, 2005

(65) Prior Publication Data

US 2006/0279703 A1 Dec. 14, 2006

(51) Int. Cl.
*G03B 21/14* (2006.01)
*G03B 21/00* (2006.01)
*G02B 5/30* (2006.01)
*G02B 27/28* (2006.01)

(52) U.S. Cl. ............................ 353/20; 353/33; 353/97; 359/496

(58) Field of Classification Search .................. 353/20, 353/31, 33, 34, 37, 97; 349/9; 359/488, 359/496

See application file for complete search history.

(56) References Cited

U.S. PATENT DOCUMENTS

| | | | |
|---|---|---|---|
| 5,822,128 A | 10/1998 | Sekine | |
| 5,896,232 A | 4/1999 | Budd et al. | |
| 5,959,778 A | 9/1999 | Shimonura et al. | |
| 6,141,151 A | 10/2000 | Shimonura et al. | |
| 6,398,364 B1 * | 6/2002 | Bryars | 353/31 |
| 6,456,012 B1 | 9/2002 | Kuroda | |
| 6,478,428 B1 * | 11/2002 | Yi et al. | 353/20 |
| 6,592,226 B1 | 7/2003 | Fujimori | |
| 2003/0103193 A1 | 6/2003 | O'Donnell et al. | |
| 2003/0122780 A1 | 7/2003 | Hendricks et al. | |
| 2003/0142276 A1 | 7/2003 | English, Jr. et al. | |
| 2003/0231262 A1 | 12/2003 | Janssen | |
| 2004/0218390 A1 | 11/2004 | Holman et al. | |
| 2004/0246389 A1 | 12/2004 | Roth | |

\* cited by examiner

*Primary Examiner*—Melissa Jan Koval

(57) ABSTRACT

A beam splitter includes a first member having at least a first dichroic layer, and a second member having at least a second dichroic layer, the first member being crossed relative to the second member.

28 Claims, 5 Drawing Sheets

BEAM SPLITTER

BACKGROUND

Display systems display an image or series of images on a display surface. In particular, each image is frequently made up of several sub-images. For example, some systems produce a red, a green, and a blue sub-image that are then combined to form a single, full-color image.

Several display systems include a light source module that produces light. The light produced by the light source module is directed to a prism and polarizer(s). The polarizer and prism split the light into component colors. For example, a tri-color prism may split the light into red, green, and blue light rays. The light directed to each of the modulator panels is then modulated to form the sub-images, as introduced.

The prisms and polarizers used to form the device are frequently expensive. Further, the prisms frequently occupy a relatively large space, thereby increasing the overall size of the display system.

SUMMARY

A beam splitter includes a first member having a first dichroic layer formed thereon; and a second member having a second dichroic layer formed thereon, said first member being crossed relative to said second member.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A multi-panel light modulator assembly is provided herein for use with projection assemblies and display systems such as televisions, projectors, etc. According to several exemplary embodiments, the multi-panel light modulator assembly includes a dichroic cross that is configured to split multi-component light into several components and direct each component to a corresponding light modulator panel. Each light modulator panel modulates the component light to form a sub-image. The sub-images are then directed back through the dichroic cross and directed to display optics.

According to several exemplary embodiments, the dichroic cross includes first and second dichroic layers formed on plates of glass to form a dichroic cross. Such a dichroic cross may be used as part of an on-axis projection assembly or an off-axis projection assembly. The term off-axis shall be understood to refer broadly to an assembly in which the paths of un-modulated light and modulated light through a dichroic beam splitter are substantially similar. The term on-axis shall be understood to refer broadly to an assembly in which the paths of un-modulated light and modulated light through a dichroic beam splitter are different.

The use of a dichroic cross for splitting and directing the light to each modulator panel may decrease the complexity and expense of the light modulator panel assembly, as well as reduce the overall size of such assemblies. An exemplary display system will first be discussed, followed by an exemplary method of modulating light and an exemplary light modulator assembly.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
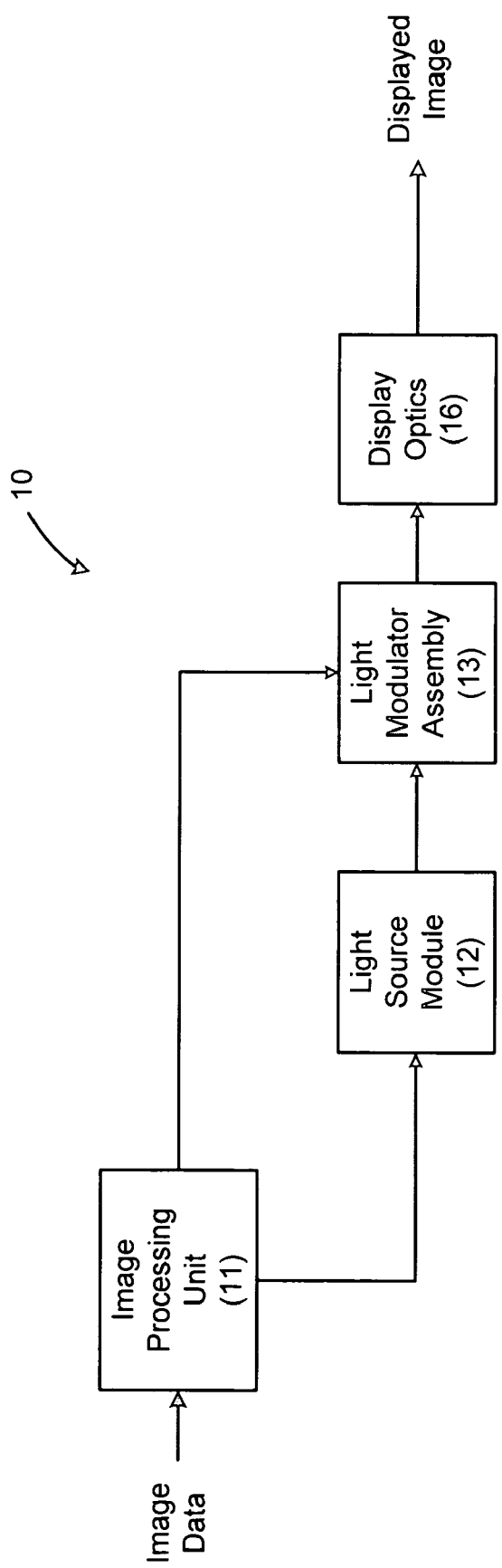
FIG. 1 illustrates a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10).

While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a light modulator assembly (13).

The light source module (12) includes a lamp assembly, which may include a burner coupled to a reflector. The light source module (12) may also include an integrator that spatially homogenizes the light and directs the light from the light source module (12) to the light modulator assembly (13).

The incident light is split into individual components. These components are then directed to corresponding modulator panels. The incident light may be modulated in its phase, intensity, polarization, or direction by the modulator panels.

For example, according to one exemplary embodiment, the light modulator assembly (13) includes a dichroic cross that splits the white light directed to the light modulator assembly (13) from the light source module (12) into component beams, and then directs the component beams, such as a red beam, a blue beam, and a green beam, to corresponding light modulator panels. Further, according to several exemplary embodiments below, the light modulator assembly (13) may make use of a dichroic cross and a coupling lens assembly to modulate light without the use of polarizers. Other exemplary embodiments make use of a projection assembly with a dichroic cross, a polarized beam splitter, and a coupling lens assembly to modulate light. In many configurations, once the light has been modulated, it is then directed back to the dichroic cross and then to the display optics (16).

The display optics (16) may include any device configured to display or project an image. For example, the display optics (16) may be, but are not limited to, a lens configured to project and focus an image onto a viewing surface. The viewing surface may be, but is not limited to, a screen, television such as a rear projection type television, wall, liquid crystal display (LCD), or computer monitor. An exemplary method of modulating light in a spatial light modulator will now be discussed.

Light Modulator Assembly Having a Dichroic Cross

Figure 2:
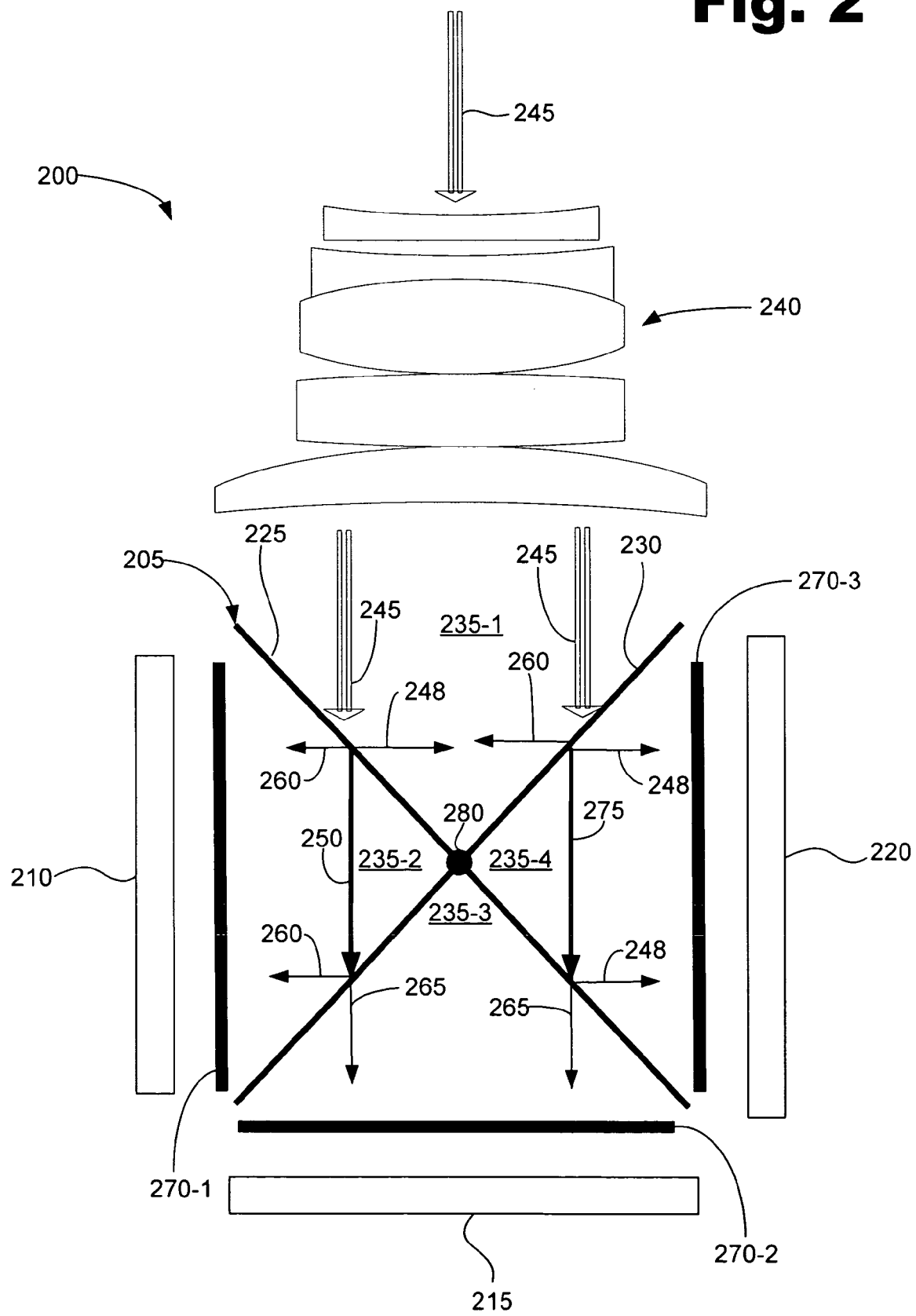
FIG. 2 illustrates a light modulator assembly that includes a dichroic cross according to one exemplary embodiment.

FIG. 2 illustrates an exemplary light modulator assembly (200). The light modulator assembly (200) includes a dichroic cross (205), and three modulator panels, which may include a blue modulator panel (210), a green modulator panel (215), and a red modulator panel (220). The light modulator panels may be of any suitable type, including reflective, LCD, and/or interference type modulator panels. While a red, blue, green configuration is described, those of skill in the art will appreciate that other configurations are possible.

Accordingly, the present exemplary light modulator assembly (200) is a three-panel type light modulator assembly. As will be discussed in more detail below, the dichroic cross (205) splits multi-component light into its individual components and directs each component to an associated modulator.

The dichroic cross (205) includes a first dichroic member (225) and a second dichroic member (230). In particular, according to the present exemplary embodiment, the first dichroic member (225) and second dichroic member (230) are substantially normal with respect to each other. The resulting cross defines first, second, third, and fourth quadrants (235-1, 235-2, 235-3, 235-4).

The first dichroic member (225), according to the first exemplary embodiment, is configured to transmit green and blue light and to reflect red light. In particular, the first dichroic member (225) may include a dichroic layer between two layers of glass or suitable transparent or semi-transparent material as is well known on the art. While a homogenous dichroic layer has been described that is configured to transmit green and blue light, those of skill in the art will appreciate that a non-homogenous dichroic layer may also be used.

The second dichroic member (230) is configured to transmit red and green light and to reflect blue light. In particular, the second dichroic member (230) may include a dichroic layer between two layers of glass or other suitable transparent or semi-transparent material. While a homogenous dichroic layer has been described that is configured to transmit green and blue light, those of skill in the art will appreciate that a non-homogenous dichroic layer may also be used.

The light modulator assembly (200) includes a coupling lens assembly (240). The coupling lens assembly (240) shown is a Gaussian type lens assembly. Multi-component light (245) is directed to the coupling lens assembly (240) from the light source module (12; FIG. 1). The coupling lens assembly (240) focuses multi-component light (245) onto light modulator panels (210, 215, 220) through the dichroic cross (205). The dichroic cross (205) splits the multi-component light (245) into component beams and directs each of the component beams to one of the corresponding light modulator panels (210, 215, 220), as will now be discussed in more detail.

Multi-component light (245) directed to the dichroic cross (205) enters the first quadrant (235-1) where it is incident on the first and second dichroic members (225, 230). That portion of multi-component light (245) incident on the first dichroic member (225) is split into two beams. The red component beam (248) is reflected away from the first dichroic member (225) while a green/blue beam (250) is transmitted to the second quadrant (235-2).

The blue/green beam (250) is directed through the second quadrant until it is incident on the second dichroic member (230). As introduced, the second dichroic member (230) is configured to transmit green light and to reflect blue light. Consequently, the second dichroic member (230) splits the blue/green beam (250) into a blue beam (260), which is reflected, and a green beam (265), which is passed into the third quadrant (235-3).

The reflected blue beam (260) is directed to the blue modulator panel (210), while the transmitted green beam (265) is directed to the green modulator panel (215). According to the present exemplary embodiment, an optional blue filter (270-1) is placed between the dichroic cross (205) and the blue modulator panel (210) and an optional green filter (270-2) is placed between the dichroic cross (205) and the green modulator panel (215). The filters (270-1, 270-2) reduce the amount of stray light directed to each modulator panel. Accordingly, the blue and green portions of multi-component light (245) incident on the first dichroic member (225) are split and directed to the blue and green modulator panels (210, 215) respectively.

The red portion (248) of multi-component light (245) incident on the first dichroic member (225) of the first quadrant (235-1) is reflected. In particular, the reflected red beam (248) is directed through the first quadrant (235-1) to the second dichroic member (230). The second dichroic member (230) transmits the red beam (248) and directs it to the red modulator panel (220). According to the present exemplary embodiment, an optional red filter (270-3) is placed between the dichroic cross (205) and the red modulator panel (220). The red filter (270-3) minimizes stray or non-red light that reaches the red modulator panel (220).

The second dichroic member (230) is also configured to split multi-component light (245) that is incident thereon in the first quadrant (235-1). In particular, when multi-component light (245) is directed to the second dichroic member (230) of the first quadrant (235-1) a red/green beam (275) is transmitted to the fourth quadrant (235-4) while a blue beam (260) is reflected.

The reflected blue beam (260) is directed across the first quadrant (235-1) to the first dichroic member (225). The first dichroic member (225) transmits the blue beam (260) through the second quadrant (235-2) to the blue modulator panel (210).

The red/green beam (275) from the first quadrant (235-1) is directed to the first dichroic member (225) in the fourth quadrant (235-4). This red/green beam (275) is then split into two beams. One beam includes a reflected red beam (248), which is directed through the red filter (270-3) to the red modulator panel (220). The second beam includes a transmitted green beam (265), which is directed through the third quadrant (235-3) and the green filter (270-2) to the green modulator panel (215).

A baffle (280) is located at the intersection between the first dichroic member (225) and the second dichroic member (230). The baffle (280) directs multi-component light (245) incident on the intersection between the first and second dichroic members (225, 230) away from the optical path of light directed back toward a display assembly. By reducing the amount of stray, unmodulated multi-component light that is directed back to the display surface, the baffle (280) may thereby help ensure that full on/full off contrast is maximized.

The light directed to red, green, and blue modulator panels (210, 215, 220) is then modulated to form individual sub-images. Several exemplary projection assemblies that include a light modulator panel assembly (300) having a dichroic cross (205) will now be discussed in more detail.

On-Axis Projection Assembly

Figure 3:
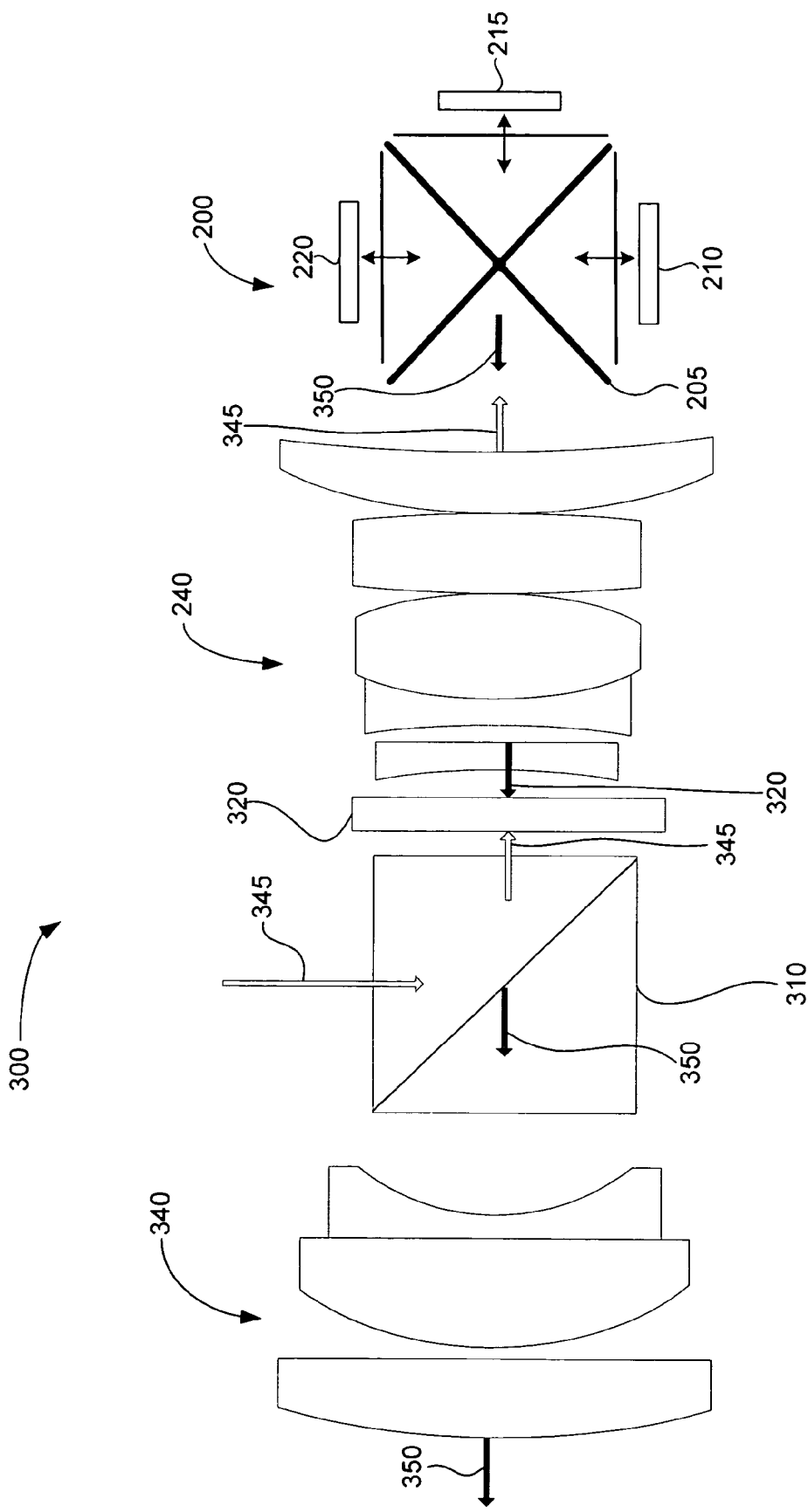
FIG. 3 illustrates an on-axis projection assembly according to one exemplary embodiment.

FIG. 3 illustrates an on-axis projection assembly (300). The projection assembly (300) includes a directing member such as a polarized beam splitter (PBS) (310), a ¼ wave plate (320), a light modulator panel assembly (200) including a dichroic cross (205), a coupling lens assembly (240), and display optics (340). As will be discussed in more detail below, the on-axis projection assembly (300) uses polarization in an on-axis configuration to direct light to and from the light modulator assembly (200).

As seen in FIG. 3, linearly polarized multi-component light (345) is directed to the PBS (310). The PBS (310) is configured to reflect the type of polarized multi-component light (345) directed thereto toward the light modulator panel assembly (200).

In particular, as the linearly polarized multi-component light (345) is directed toward the light modulator assembly (200), it passes through the ¼ wave plate (320) and the coupling lens assembly (240). According to the present exemplary embodiment, the ¼ wave plate (320) changes the polarization of the linearly polarized light to circularly polarized.

After the polarized multi-component light (345) is passed initially through the ¼ wave plate (320), the circularly polarized multi-component light (345) is directed to the coupling lens assembly (240). The coupling lens assembly (240) collimates the polarized light (345) and focuses it onto the light modulator assembly (200). The light modulator assembly (200) splits the polarized multi-component light (345) and directs the component beams onto the red, green, and blue modulator panels (210, 215, 220).

The modulated component beams are then returned along substantially the same paths as taken to the modulator panels. This modulated light exits the light modulator assembly (200) and is directed to the coupling lens assembly (330). The coupling lens assembly (330) collimates and combines the output of each of the modulator panels (210, 215, 220) exiting the light modulator assembly (200) into a modulated light beam (350) and directs the modulated light beam (350) to the ¼ wave plate (320).

After reflection off the modulator and passing through the ¼ wave plate (320) a second time the light will be linearly polarized orthogonally to the original polarization. This reverse polarized modulated light is then directed to the PBS (310). As previously discussed, the PBS (310) is configured to reflect the linearly polarized multi-component light (345). In addition, the PBS (310) is configured to transmit orthogonally polarized light. Thus, the orthogonal orientation of the modulated light beam (350) allows it to be transmitted through the PBS (310). Accordingly, the PBS (310) passes the modulated light to the display optics assembly (340). The display optics assembly (340) directs the modulated light onto a display surface to form a full-color image thereon.

Off-Axis Projection Assembly

Figure 4:
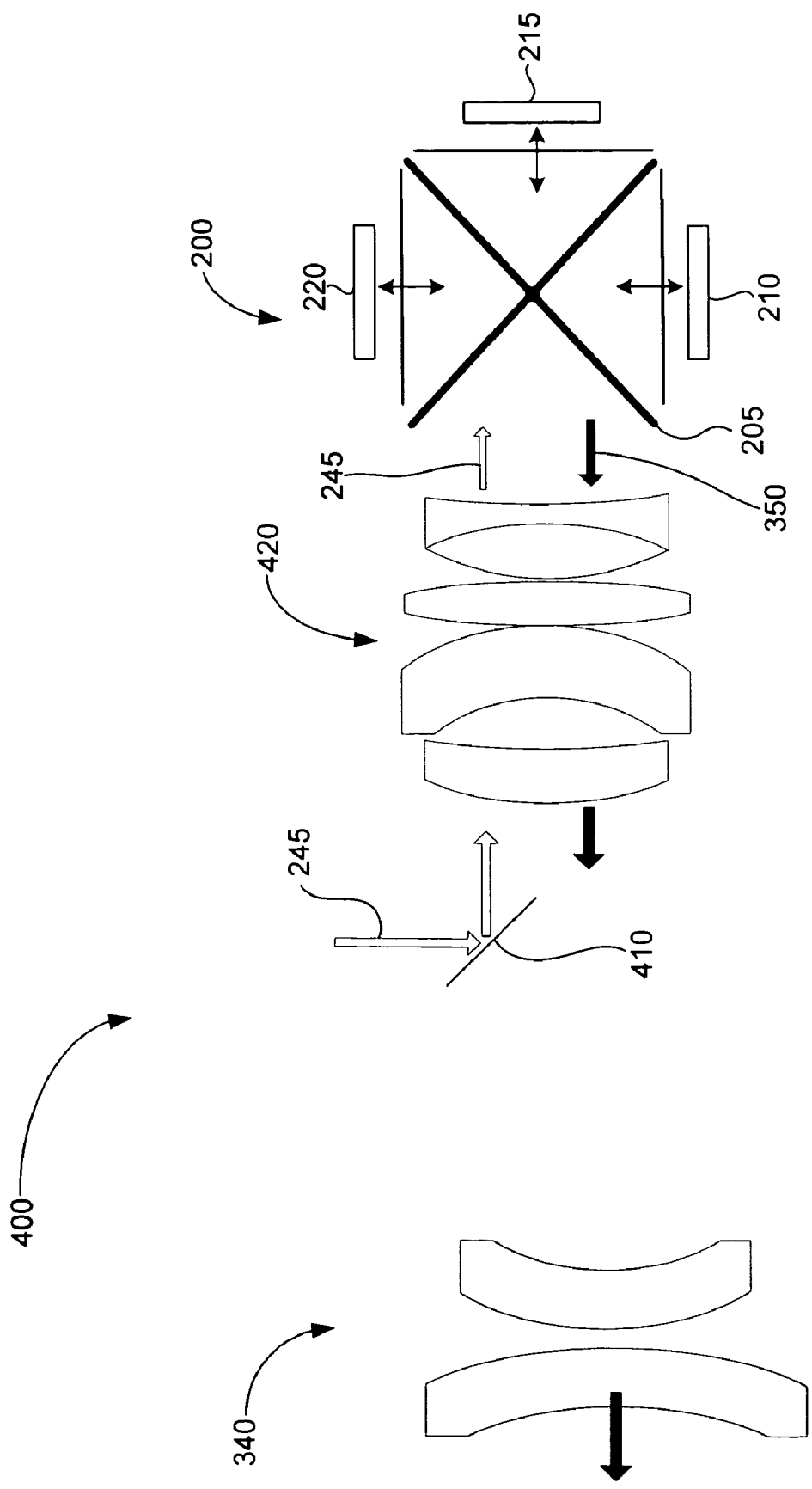
FIG. 4 illustrates an off-axis projection assembly according to one exemplary embodiment.

FIG. 4 illustrates an off-axis projection assembly (400). The projection assembly (400) includes a directing member such as a turning mirror (410), a coupling lens assembly (420), a light modulator assembly (200) including a dichroic cube (205), and a display optics assembly (340). Multi-component light (245) from a light source module (12) is directed to the turning mirror (410).

The turning mirror (410) is located at the optical pupil of the projection assembly (400). This location of the turning mirror (410) may simultaneously minimize the size of the turning mirror and the angle of the off-axis illumination. The turning mirror (410) directs the multi-component light (245) to the coupling lens assembly (420).

The coupling lens assembly (420) focuses the illumination to the light modulator assembly (200). In particular, according to one exemplary embodiment shown in FIG. 4, the multi-component light (245) is directed to the dichroic cross (205) through a first or top portion of the coupling lens assembly (420). The dichroic cube (205) splits the multi-component light (245) into its color components and directs each color component to the blue, green, and red modulator panels (210, 215, 220) as previously discussed.

Each component color is modulated by the blue, green, and red modulator panels (210, 215, 220) to form individual sub-images or modulated components. These individual modulated components are then redirected from the blue, green, and red modulator panels (210, 215, 220) back through the dichroic cube (205) and then to the coupling lens assembly (420).

In particular, according to the present exemplary embodiment, the modulated components travel through a second portion of the coupling lens assembly (420). As a result, the multi-component light (245) and modulated component beams (350) are separated. The degree of separation is due, at least in part, to the off-axis angle, which may be approximately 10 degrees. The off-axis angle refers generally to angle between the path taken by the multi-component light (245) and the modulated component beams (350).

As the modulated light travels through the coupling lens assembly (420), the modulated light is collimated, combined and passed to the display optics assembly (340). The display optics assembly then focuses the modulated light onto a viewing surface to form an image.

Method of Forming a Light Modulator Assembly

Figure 5:
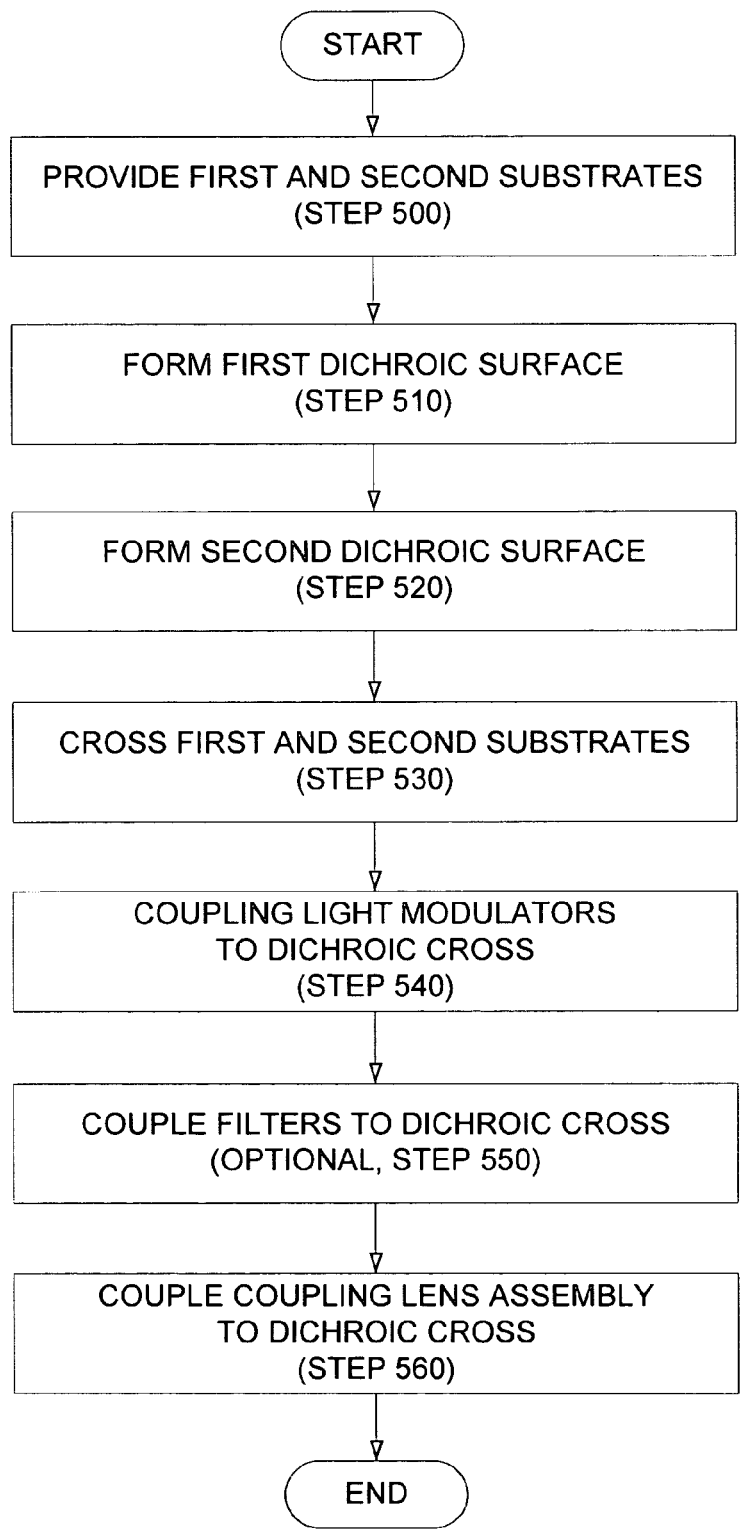
FIG. 5 illustrates a method of forming a light modulator assembly according to one exemplary embodiment.

FIG. 5 is a flowchart illustrating a method of forming a light modulator assembly. The method begins by providing substrates for first and second dichroic layers (steps 500). Such substrates may include glass plates that are approximately 0.7 mm thick.

A first dichroic layer is then formed on the first substrate (step 510). For example, the first dichroic layer may be formed between two plates of glass. According to the present exemplary embodiment, the first dichroic layer may be configured to transmit blue and green light and to reflect red light.

Further, the first dichroic layer may be non-homogenous. In particular, according to one example embodiment, a first portion of the first dichroic layer may reject red light while passing the remaining wavelengths, which may include blue and green light. According to such an example embodiment, a second portion of the first dichroic layer may be configured to pass green light and to reflect red light in particular.

The next step is to form a second dichroic layer (step 520). For example, the second dichroic layer may also be formed between two plates of glass. According to the present exemplary embodiment, the second dichroic layer is configured to transmit red and green light and to reflect blue light.

Additionally, the second dichroic layer may also be non-homogenous. Similar to a first dichroic layer described above, the second dichroic layer may include a first portion that rejects blue light while passing the remaining wavelengths, which may include red and green light. According to such an example embodiment, the second portion of the second dichroic layer may be configured to pass green light and to reflect blue light in particular.

Thereafter, the first and second members are crossed (step 530). The resulting dichroic cross is configured to separate white light into its component parts and direct it to corresponding light modulator panels. The first and second members may also be formed initially.

After the dichroic cross has been formed (steps 500-530), corresponding light modulator panels are optically coupled to the dichroic cross (step 540). The light modulator panels may be of any suitable type, including, without limitation, liquid crystal displays (LCD), reflective and/or interference type light modulators.

Corresponding filters may optionally be optically coupled thereto (step 550). The optional filters may include red, blue, and green filters placed between the dichroic cross and the corresponding light modulator panel. The optional filters are configured to absorb undesired light directed to the corresponding light modulator panel.

The use of filters may reduce the dimensional tolerances associated with the surfaces of the dichroic cross. In particular, undesired light that may be directed due to surface imperfections and/or dimensional tolerances may be absorbed by the optional filter such that only component light corresponding to each light modulator panel is incident on that modulator panel.

A coupling lens assembly is then optically coupled to the dichroic cross (step 560). The coupling lens assembly is configured to focus light onto the light modulator panels. The coupling lens assembly may direct the light to and from the dichroic cross in an on-axis or off-axis configuration, as previously discussed.

In conclusion a multi-panel light modulator assembly has been discussed herein for use with projection assemblies and display systems such as televisions, projectors, etc. According to several exemplary embodiments, the multi-panel light modulator assembly includes crossed dichroic layers that are configured to split multi-component light into several components and direct each component to a corresponding light modulator panel. Each light modulator panel modulates the component light to form a sub-image. The sub-images are then directed back through the dichroic beam splitter and directed to display optics.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A beam splitter, comprising:
   a first member having at least a first dichroic layer;
   a second member having at least a second dichroic layer, said first member being crossed relative to said second member, and
   a baffle located at an intersection of said first and second members.

2. The beam splitter of claim 1, wherein said first member is substantially normal to said second member.

3. The beam splitter of claim 1, wherein said first dichroic layer is configured to reflect red light and to transmit green/blue light and said second dichroic layer is configured to reflect blue light and to transmit red/green light.

4. The beam splitter of claim 1, wherein said first member includes a first dichroic layer between two layers of glass and said second member includes a second dichroic layer between two layers of glass.

5. The beam splitter of claim 1, wherein said first member includes a first portion configured to reject red light and to transmit blue and green light and a second portion configured to reflect blue light and transmit green light.

6. The beam splitter of claim 1, wherein said second member includes a first portion configured to reject blue light and to transmit red and green light and a second portion configured to reflect blue light and transmit green light.

7. A light modulator assembly, comprising:
   a dichroic cross including first and second dichroic layers, said dichroic layers being crossed relative to one another and having a baffle located at an intersection of said first and second members; and
   first, second, and third light modulator panels in optical communication with said dichroic beam splitter.

8. The assembly of claim 7, wherein said first dichroic layer is configured to reflect red light and to transmit blue and green light and said second dichroic layer is configured to reflect blue light and to transmit red and green light.

9. The assembly of claim 7, and further comprising first, second, and third filters located between said dichroic beam splitter and said first, second, and third light modulator panels.

10. The assembly of claim 7, and further comprising a coupling lens assembly in optical communication with said dichroic beam splitter, said coupling lens assembly being configured to collimate white light and focus said white light onto said dichroic beam splitter; and a directing member configured to direct light from a light source to said coupling optics.

11. The assembly of claim 10, wherein said directing member including a polarizing beam splitter cube.

12. The assembly of claim 10, wherein said directing member comprises a turning mirror.

13. The assembly of claim 10, and further comprising a display optics assembly.

14. The assembly of claim 11, wherein said coupling lens assembly, said dichroic cross, and said polarizing beam splitter are configured to modulate light in an on-axis configuration.

15. The assembly of claim 12, wherein said coupling lens assembly, said turning mirror, and said turning mirror are configured to modulate light in an off-axis configuration.

16. A display system, comprising:
   a light source module;
   a spatial light modulator assembly including a dichroic cross including first and second dichroic layers, said dichroic layers being crossed relative to one another, and a baffle located at an intersection of said first and dichroic layers; and
   an image processing unit coupled to said spatial light modulator assembly and being configured to control said spatial light modulator assembly to modulate light from said light source module.

17. The system of claim 16, wherein said spatial light modulator includes a first, second, and third light modulator panels in optical communication with said dichroic cross.

18. The system of claim 16, and further comprising a directing member and coupling optics, said directing member being configured to direct light through said coupling optics to said spatial light modulator assembly.

19. The system of claim 16, wherein said directing member includes a polarized beam splitter.

20. The system of claim 17, wherein at least one of said first, second, and third light modulator panels is a LCD, a reflective, and an interference type light modulator panel.

21. The system of claim 18, wherein said directing member includes a turning mirror.

22. A method of forming a light modulator assembly, comprising:
   forming a first dichroic layer on a first member;
   forming a second dichroic layer on a second member;
   crossing said first member and second members to form a dichroic cross having an intersection while locating a baffle at the intersection between the first dichroic layer and the second dichroic layer; and
   placing first, second, and third light modulator panels in optical communication with said dichroic cross.

23. The method of claim 22, wherein forming said first and second dichroic layers on first and second members includes forming first and second dichroic layers between opposing glass plates.

24. The method of claim 22, and further comprising first, second, and third filters at least partially between said first, second, and third light modulator panels.

25. The method of claim 23, wherein said glass plates are approximately 0.7 mm thick.

26. A display system, comprising:
   means for generating light;
   a beam splitter optically coupled to said means for generating light, said beam splitter including a first member having a first dichroic layer formed thereon and a second member having a second dichroic layer formed thereon, said first member being crossed relative to said second member and further including a baffle located at an intersection of said first and second members; and
   means for modulating said light to produce modulated light in optical communication with said beam splitter.

27. The system of claim 26, and further comprising means for directing said light to said beam splitter.

28. The system of claim 26, and further comprising means for displaying said modulated light.

* * * * *